United States Patent
Tonegawa

(10) Patent No.: US 10,983,740 B2
(45) Date of Patent: Apr. 20, 2021

(54) IMAGE FORMING APPARATUS, METHOD, STORAGE MEDIUM STORING PROGRAM, AND SYSTEM

(71) Applicant: CANON KABUSHIKI KAISHA, Tokyo (JP)

(72) Inventor: Nobuyuki Tonegawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 397 days.

(21) Appl. No.: 15/898,299

(22) Filed: Feb. 16, 2018

(65) Prior Publication Data

US 2018/0253268 A1 Sep. 6, 2018

(30) Foreign Application Priority Data

Mar. 2, 2017 (JP) ................. JP2017-039774

(51) Int. Cl.
| | |
|---|---|
| G06F 3/12 | (2006.01) |
| H04N 1/00 | (2006.01) |
| G06F 21/62 | (2013.01) |
| H04L 9/32 | (2006.01) |
| G06F 21/33 | (2013.01) |
| G06F 21/60 | (2013.01) |

(52) U.S. Cl.
CPC .......... *G06F 3/1238* (2013.01); *G06F 3/1204* (2013.01); *G06F 3/1292* (2013.01); *G06F 21/335* (2013.01); *G06F 21/608* (2013.01); *G06F 21/62* (2013.01); *H04L 9/3213* (2013.01); *H04N 1/0035* (2013.01); *H04N 1/00244* (2013.01); *G06F 2221/2141* (2013.01)

(58) Field of Classification Search
CPC .... G06F 3/1238; G06F 3/1203; G06F 3/1278; G06F 3/1289; G06F 3/1271; G06F 3/1287; G06F 21/31; H04N 1/00307; H04L 63/08; H04L 63/083; H04L 67/16
See application file for complete search history.

(56) References Cited

U.S. PATENT DOCUMENTS

| | | | |
|---|---|---|---|
| 9,727,283 B2 | 8/2017 | Iwasaki et al. | |
| 2008/0133914 A1* | 6/2008 | Isaacson | G06F 21/31 |
| | | | 713/170 |
| 2012/0314250 A1* | 12/2012 | Ito | H04N 1/4406 |
| | | | 358/1.15 |

(Continued)

FOREIGN PATENT DOCUMENTS

| | | |
|---|---|---|
| JP | 2013-105442 A | 5/2013 |
| JP | 2014-067379 A | 4/2014 |

(Continued)

OTHER PUBLICATIONS

Japanese Office Action dated Nov. 27, 2020 in corresponding Japanese Patent Appln. No. 2017-039774.

(Continued)

*Primary Examiner* — Tae K Kim
(74) *Attorney, Agent, or Firm* — Venable LLP

(57) ABSTRACT

User information is obtained, and an access token for receiving provision of a service from a service provider is obtained. The obtained access token is stored in a memory unit in association with the user information. In accordance with an instruction, the service provider is accessed using the access token stored in the memory unit, and a function corresponding to the instruction is executed.

14 Claims, 12 Drawing Sheets

(56) References Cited

U.S. PATENT DOCUMENTS

| | | | |
|---|---|---|---|
| 2014/0090028 A1* | 3/2014 | Matsugashita | H04L 63/0807 726/4 |
| 2015/0092233 A1* | 4/2015 | Park | H04N 1/00307 358/1.15 |
| 2015/0153981 A1* | 6/2015 | Iwasaki | G06F 3/1292 358/1.14 |
| 2015/0154484 A1* | 6/2015 | Iwasaki | G06F 3/1222 358/1.14 |
| 2015/0181080 A1* | 6/2015 | Nuggehalli | H04N 1/00244 358/1.15 |
| 2015/0264030 A1* | 9/2015 | Iwasaki | G06F 21/608 358/1.14 |
| 2015/0319339 A1* | 11/2015 | Morita | G06F 21/31 726/18 |
| 2015/0370513 A1* | 12/2015 | Mizoguchi | G06F 3/1238 358/1.15 |
| 2016/0011830 A1* | 1/2016 | Asakura | G06F 3/1292 358/1.15 |
| 2016/0110138 A1* | 4/2016 | Miyata | G06F 3/1292 358/1.15 |
| 2016/0274841 A1* | 9/2016 | Suzuki | G06F 3/1238 |
| 2016/0275879 A1* | 9/2016 | Hodges | G06F 3/147 |
| 2016/0335036 A1* | 11/2016 | Iwasaki | H04L 63/08 |
| 2017/0031638 A1* | 2/2017 | Kitagata | H04N 1/32523 |
| 2017/0078517 A1* | 3/2017 | Iwasaki | H04L 63/08 |
| 2017/0097799 A1* | 4/2017 | Okumura | G06F 3/1258 |
| 2017/0208214 A1* | 7/2017 | Asakura | H04N 1/4426 |
| 2017/0269885 A1* | 9/2017 | Omori | G06F 3/1288 |
| 2020/0019357 A1* | 1/2020 | Omori | G06F 3/1238 |
| 2020/0169553 A1* | 5/2020 | Lee | H04W 12/0608 |

FOREIGN PATENT DOCUMENTS

| | | |
|---|---|---|
| JP | 2015118533 A | 6/2015 |
| JP | 2015138392 A | 7/2015 |

OTHER PUBLICATIONS

Japanese Office Action dated Feb. 19, 2021 in corresponding Japanese Patent Appln. No. 2017-039774.

* cited by examiner

FIG 4

```
http://172.24.10.10/rui/user_tanaka.html  ~401
FILE    EDIT    DISPLAY    FAVORITE    TOOL
```

402
CLOUD PERSONAL SETTING USER : tanaka

403
SMTP USE    [ YES ]

404
EMAIL ADDRESS    [ tanaka@xyz.com ]

405
USE CLOUD PRINT    [ YES ]

406
PASSWORD    [                    ]

CLOUD PRINT

USER : tanaka

PLEASE SELECT DOCUMENTS TO PRINT

ACCESS TOKEN VALIDITY PERIOD : 2017/12/31

| DOCUMENT NAME | NUMBER OF PAGES | DATE |
|---|---|---|
| PRODUCT SPECIFICATION | 50 | 2016/11/25 |
| RECEIPTS | 1 | 2016/11/20 |
| QUOTATION | 3 | 2016/11/24 |
|  |  |  |
|  |  |  |

PRINTING SETTING   PRINT   LOGOUT

FIG. 10A

| USER ID | USER NAME | PASSWORD | EMAIL ADDRESS | ACCESS TOKEN SMTP ID | ACCESS TOKEN STORAGE ID |
|---|---|---|---|---|---|
| 1 | tanaka | user111 | tanaka@xyz.com | 3 | 1 |
| 2 | user_2 | 7645321 | user_2@xyz.com | 4 | 2 |
| 3 | user_3 | 3user | user_3@xyz.com | 6 | 5 |

FIG. 10B

| ACCESS TOKEN ID | ACCESS TOKEN | VALIDITY PERIOD |
|---|---|---|
| 1 | n4hgnfmfgmfPODFmfmmghHfmfSHf | 2016/12/31 |
| 2 | guufdgsdg5y5SDHKt4j5thkjRyDKS | 2016/12/31 |
| 3 | 64YhnfQjhnfFtyoKedMcrthdrtFPh | 2016/12/31 |
| 4 | jkufjkgl87n5e67dfkoyhdssgQEekl | 2016/12/31 |
| 5 | ArthWrhf7tjkuk69dths47shthy23y | 2016/12/31 |
| 6 | YUdhdshiofdji6tYHK5jkH89843hkf0 | 2016/12/31 |

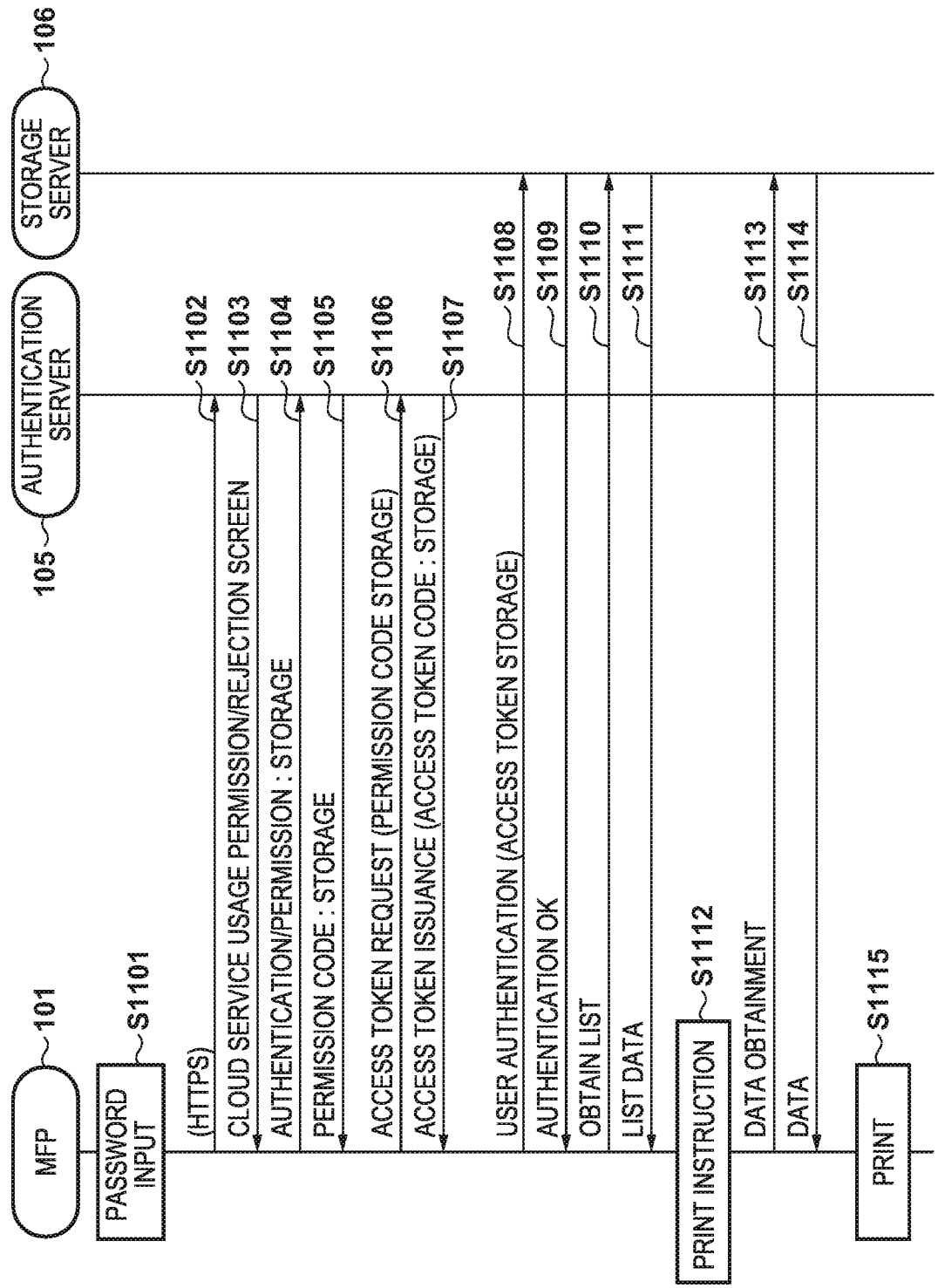

IMAGE FORMING APPARATUS, METHOD, STORAGE MEDIUM STORING PROGRAM, AND SYSTEM

BACKGROUND OF THE INVENTION

Field of the Invention

The present invention relates to an image forming apparatus that can use a cloud service, a method, a storage medium storing a program, and a system.

Description of the Related Art

Cloud services in which servers are installed in a cloud on the Internet and that can be accessed from mobile terminals such as a mobile phone in addition to PCs are spreading. As a technique for authenticating a user who uses such a cloud service, there is OAuth 2.0 which uses an access token. OAuth 2.0 is defined as RFC 6749 and RFC 6750.

Japanese Patent Laid-Open No. 2015-118533 and Japanese Patent Laid-Open No. 2015-138392 recite techniques for using an access token to print data that is on a cloud.

In authentication processing defined in OAuth 2.0, there is a need to open an authentication screen of a certificate authority by using a Web browser, input a username and a password, and permit usage of a service. For this reason, it is difficult for a printer or scanner in which a Web browser is not installed to use a service that makes use of OAuth 2.0. To solve such a problem, in Japanese Patent Laid-Open No. 2015-118533 and Japanese Patent Laid-Open No. 2015-138392, user authentication is performed by a printer or scanner obtaining an access token from a mobile terminal, or a mobile terminal communicating with the printer or scanner by NFC.

However, as a result, processing becomes cumbersome because a communication procedure as described above is performed between a printer and a mobile terminal each time data is obtained from the cloud, and the operation puts a burden on the user.

SUMMARY OF THE INVENTION

An aspect of the present invention is to eliminate the above-mentioned problems with the conventional technology. The present invention provides an image forming apparatus for optimizing processing when receiving the provision of a service from a service provider, a method, a storage medium storing a program, and a system.

The present invention in one aspect provides an image forming apparatus, comprising: a first obtainment unit configured to obtain user information; a second obtainment unit configured to obtain an access token for receiving provision of a service from a service provider; a storage unit configured to store, in a memory unit, the access token obtained by the second obtainment unit in association with the user information obtained by the first obtainment unit; and an execution unit configured to, in accordance with an instruction, access the service provider using the access token stored in the memory unit by the storage unit, and execute a function corresponding to the instruction.

By virtue of the present invention, it is possible to optimize processing when a provision of a service is received from a service provider.

Further features of the present invention will become apparent from the following description of exemplary embodiments with reference to the attached drawings.

BRIEF DESCRIPTION OF THE DRAWINGS

FIG. 4 is a view which illustrates a cloud personal setting screen.

FIG. 8 is a view illustrating a cloud print setting screen which is displayed on the MFP.

FIGS. 10A and 10B are views which illustrate management forms of access tokens which are stored by the MFP.

FIG. 11 is a sequence diagram which illustrates a procedure for processing for obtaining an access token.

DESCRIPTION OF THE EMBODIMENTS

Figure 1:
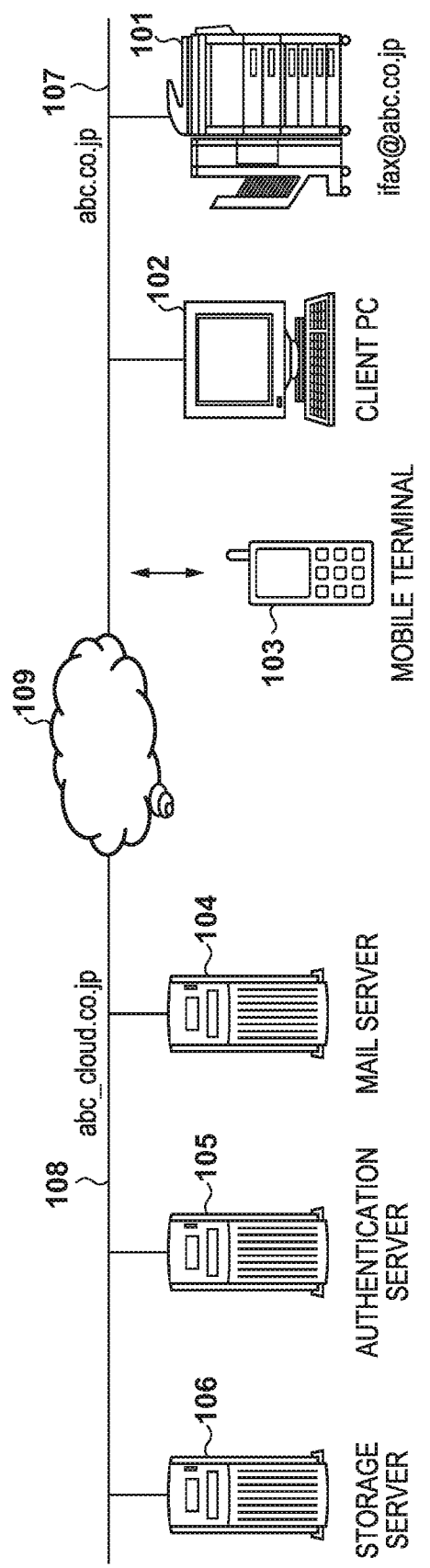
FIG. 1 is a view which illustrates a system configuration.

Embodiments of the present invention will be described hereinafter in detail, with reference to the accompanying drawings. Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that the same reference numerals have been added to the same configuration elements, and explanation thereof is omitted.

First Embodiment

FIG. 1 is a view that illustrates a system configuration that includes an image forming apparatus in the present embodiment. A system 100 is a system that can receive provision of a cloud service such as a cloud print from a service provider. As illustrated in FIG. 1, a mail server 104, an authentication server 105, and a storage server 106 are configured on a service provider side, and an image forming apparatus 101, a client PC 102, and a mobile terminal 103 are configured on a client side.

In the present embodiment, an MFP (Multi Function Peripheral), for example, is used as the image forming apparatus 101. Below, the image forming apparatus 101 is described as the MFP 101. The MFP 101 is provided with a printer function, a transmission function for transmitting an image file read by a scanner to another apparatus, and an IFAX function for communicating an image read by the scanner to a device of the same type and for printing a received image, for example. The MFP 101 is connected to a network 107.

The network 107 is a network that has the domain name of abc.co.jp, and is connected to other networks via the Internet 109. A network 108 is a network that has the domain name of abc cloud.co.jp, and is connected to the Internet 109. The mail server 104 and the authentication server 105 are configured on the network 108, and a cloud is formed.

The client PC 102, which has the configuration of a general-purpose PC, is connected to the network 107, and can use a cloud mail function which is a cloud service by using SMTP and the POP3 protocol. In addition, the client PC 102 is installed with a browser function, and can connect to the MFP 101 by using the browser function.

The storage server 106 is configured on the network 108. The storage server 106 operates as a file server on the cloud in combination with the authentication server 105. In the system 100, the client PC 102 can use a protocol such as FTP or WebDAV to save document data on the storage server 106. In addition, the client PC 102 can perform print processing after obtaining document data saved on the storage server 106.

The mobile terminal 103 is connected to the network 107 by a wireless LAN such as Wi-Fi (registered trademark), and a browser function is installed thereon. Consequently, the mobile terminal 103 can connect to the MFP 101 by using the browser function similarly to the client PC 102, and can access the storage server 106. In addition, in the present embodiment, an application that is dedicated to the MFP 101 (hereinafter, the dedicated app) is installed on the mobile terminal 103, and setting of the MFP 101 is possible from the mobile terminal 103.

In FIG. 1, one of each of the MFP 101, the client PC 102 and the mobile terminal 103 are illustrated, but a plurality of each may be configured. The mail server 104, the authentication server 105, and the storage server 106 are configured in the cloud, but a server in accordance with a service provided by a service provider may be appropriately configured.

Figure 2:
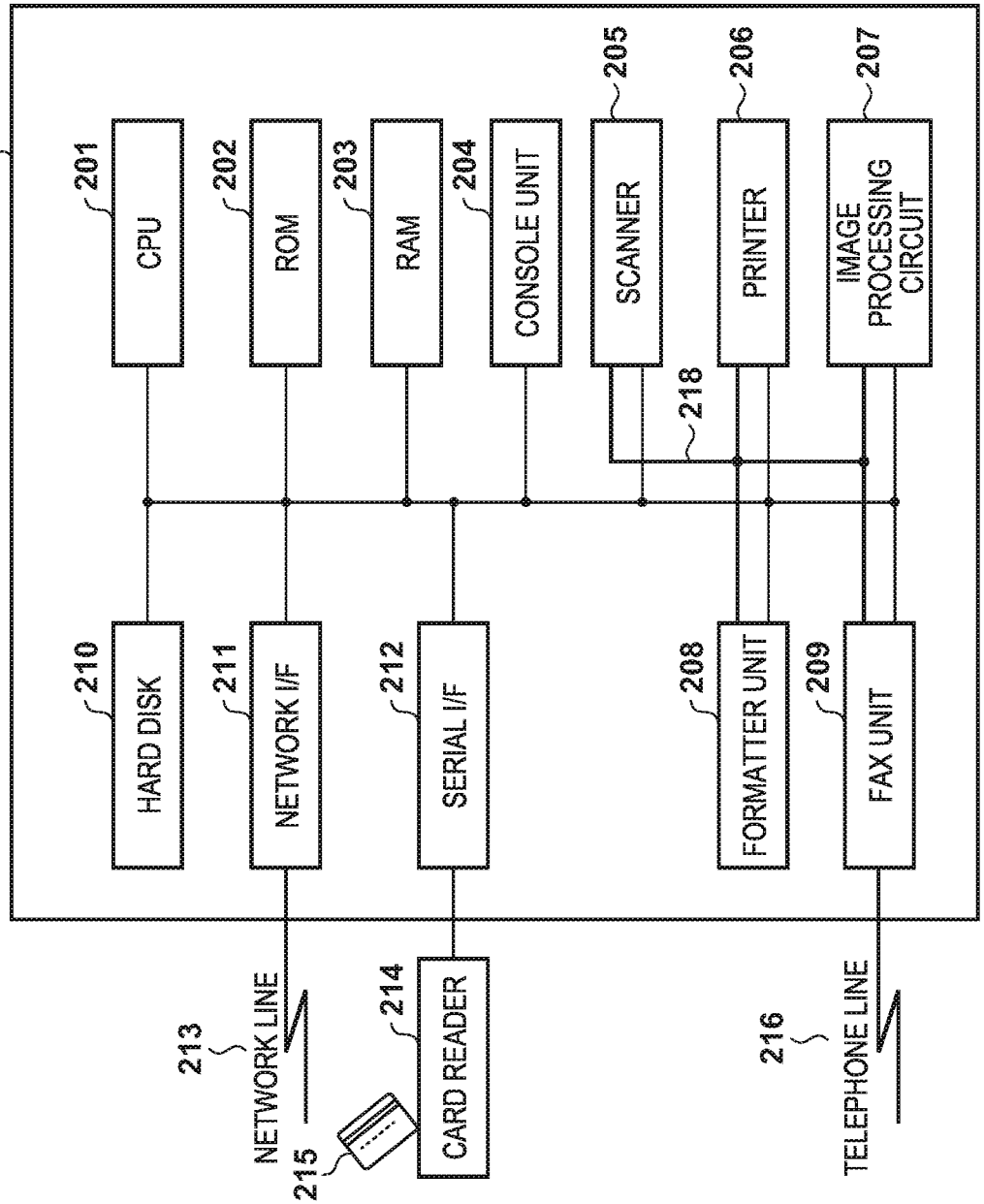
FIG. 2 is a view which illustrates a hardware configuration of an MFP.

FIG. 2 is a view which illustrates a hardware configuration of the MFP 101. A CPU 201 comprehensively controls the MFP 101, and for example executes operation of the MFP 101 by reading a program stored in a ROM 202 into a RAM 203 and then executing the program. A console unit 204 is an LUI (Local User Interface (configured from an LCD display panel and hard keys such as a start key and a numeric keypad, and accepts a setting or an instruction operation from a user. In addition, the console unit 204 displays a user interface screen or softkeys on the LCD display panel and detects a touch operation by a user to thereby accept a setting or an instruction operation from the user.

A scanner 205 optically reads an image on an original that is loaded on an original platen (not shown) or fed from a document feeding apparatus (ADF), and generates image data. A printer 206 prints an image onto a print medium based on image data. The printer 206 has a configuration that supports various methods of printing such as an ink-jet printing method or an electro photographic method.

An image processing circuit 207 is configured to include a large capacity image memory, an image rotation circuit, a resolution resizing circuit, an encode/decode circuit such as for MH, MR, MMR, JBIG, and JPEG, and the like. The image processing circuit 207 executes various image processing such as shading, trimming, and masking, in accordance with functions of the MFP 101. For example, the image processing circuit 207 generates an image file whose format is JPEG, PDF, TIFF, or the like from image data read by the scanner 205.

A hard disk 210 is a mass storage medium connected by an interface such as SCSI or IDE, and stores and manages setting data and various databases. Data, tables and the like used in the present embodiment are also stored and managed by the hard disk 210.

A network interface (I/F) 211 is connected to a network line 213 that uses a technology such as token ring or Ethernet (registered trademark) implementing 10BASE-T, 100BASE-T, or the like. The network line 213 corresponds to the network 107 of FIG. 1. A formatter unit 208 is a rendering unit for generating print data that can be processed by the printer 206. For example, in a case of receiving PDL (Page Description Language) data from the client PC 102 via the network I/F 211, the formatter unit 208 generates print data based on the received PDL data. The generated print data is subsequently subject to image processing by the image processing circuit 207, and is used in print processing by the printer 206.

The scanner 205, the printer 206, the image processing circuit 207, and the formatter unit 208 are also connected to a high speed video bus 218 which is configured separately, in addition to being connected to a CPU bus 217 from the CPU 201, and are configured to as to be able to transfer data at high speed. By such a configuration a high speed copy function in which image data read by the scanner 205 is subject to image processing by the image processing circuit 207 and then printed by the printer 206 is realized.

A fax unit 209 controls facsimile communication with an external apparatus over a telephone line 216. The fax unit 209 is also connected to the high speed video bus 218 in addition to the CPU bus 217. By such a configuration, a high speed fax transmission function in which image data read by the scanner 205 is subject to image processing by the image processing circuit 207 and subsequently transmitted from the fax unit 209 to an external apparatus via the telephone line 216 is realized. Similarly, a high speed fax reception function in which image data from an external apparatus is received by the fax unit 209, subsequently subject to image processing by the image processing circuit 207, and printed by the printer 206 is realized.

The CPU 201 has a file transmission (SEND) function for transmitting an image file such as a PDF generated by the image processing circuit 207 from the network I/F 211 by a communication protocol such as SMTP, FTP, SMB, or WebDAV. In the present embodiment, the file transmission function is used in a file transmission, an electronic mail transmission, an Internet facsimile (IFAX) transmission, or a fax transmission, for example.

In a case where an electronic mail transmission is performed, the CPU 201 transmits an image file generated by the image processing circuit 207 whose format is JPEG, PDF, TIFF, or the like by the SMTP protocol. In addition, in a case where a file transmission is performed, the CPU 201 transmits an image file as described above by an FTP, SMB, or WebDAV protocol.

For an IFAX transmission, there is an image communication procedure defined by RFC 2305 in which a facsimile function is realized by attaching an image file to an electronic mail and performing transmission/reception between devices of the same type. When an IFAX transmission is performed, the CPU 201 generates, by the image processing circuit 207, a TIFF file that is defined by RFC 3949 from image data read by the scanner 205, and transmits it by an SMTP protocol.

The CPU 201 also has an IFAX reception function, and when IFAX reception is performed, the CPU 201 first uses an SMTP or POPS function to receive an electronic mail to which a TIFF file is attached. The CPU 201 converts the TIFF file to an internal image format by the image processing circuit 207, and subsequently performs printing by the printer 206. When a fax transmission that uses a file transmission function is performed, the CPU 201 uses the fax unit 209 to connect to the telephone line 216, and performs a G3 FAX transmission.

A serial I/F 212 is an RS232C serial interface or the like, and is an interface for causing an external device to connect to the MFP 101. In the present embodiment, a card reader 214 is connected to the serial I/F 212. When a card 215 is placed on the card reader 214 or the card 215 is close to the card reader 214, card information such as a user ID recorded on the card 215 is read. The CPU 201 obtains the read card information via the serial I/F 212. By such a configuration the CPU 201 can execute user authentication with respect to the MFP 101.

The CPU 201 also has an HTTP server function, and a remote user interface function (RUI: Remote User Interface). An RUI function is a function for enabling remote confirmation/setting from the client PC 102 or the mobile terminal 103 for various settings of the MFP 101, and state information of the MFP 101, for example. The RUI function is enabled by an ON/OFF setting item for the RUI function in a management menu screen of the MFP 101, for example.

Figure 3:
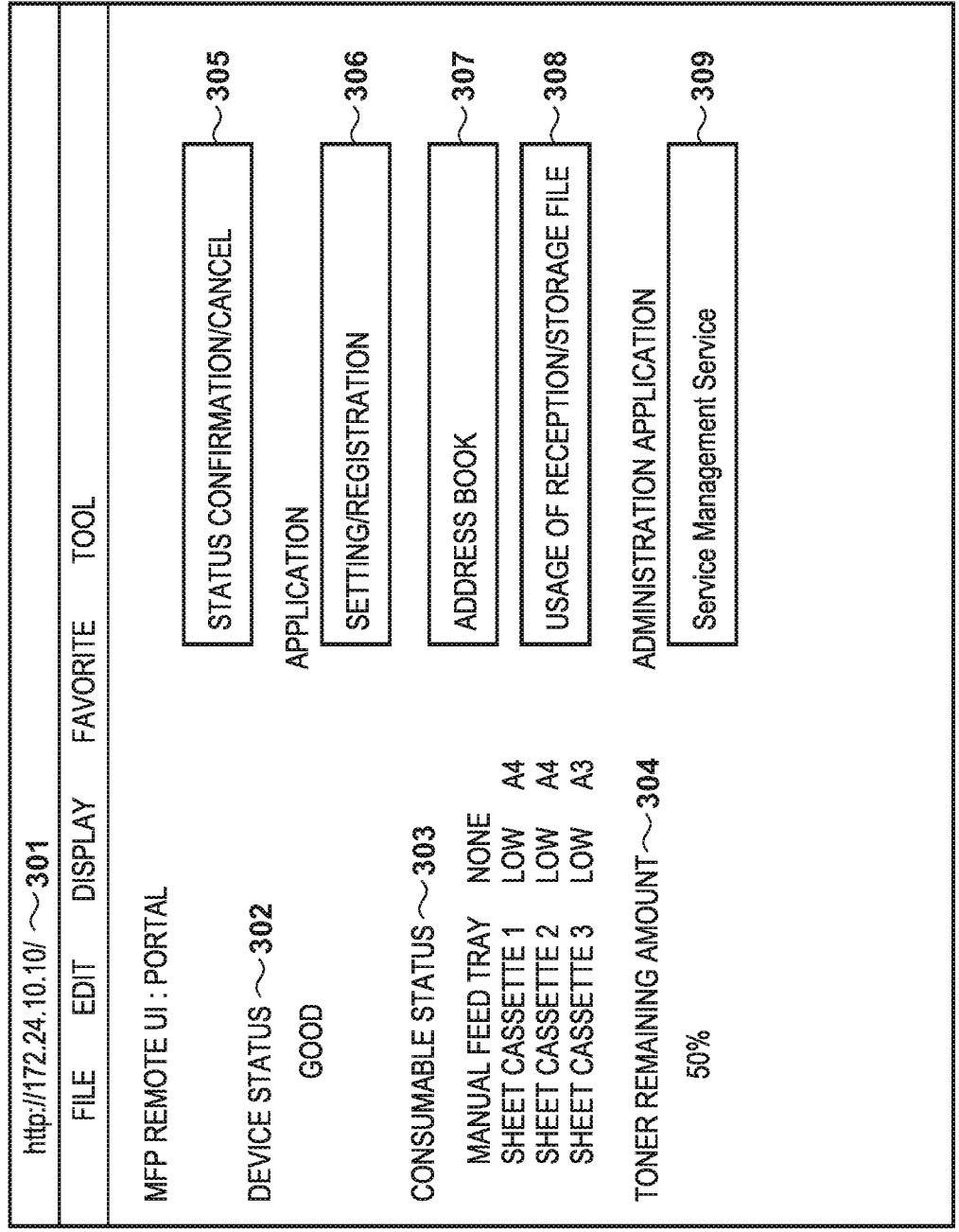
FIG. 3 is a view which illustrates a screen displayed at the time of an access to an RUI function of the MFP.

FIG. 3 is a view which illustrates an example of a screen displayed at the time of an access to an RUI function of the MFP 101. A TOP screen 300 of FIG. 3 is displayed on a Web browser of the client PC 102, or on a Web browser or a dedicated app of the mobile terminal 103.

The TOP screen 300 is a screen that is displayed, on a Web browser, when user authentication for accessing the RUI function of the MFP 101 ends. User authentication for accessing the RUI function of the MFP 101 is performed in the following way, for example. Explanation is given below of accessing the MFP 101 from the client PC 102, but it is similar in the case where the MFP 101 is accessed from the mobile terminal 103.

Firstly, when "http://172.24.10.10" is inputted into a URL input area of the Web browser, a connection from the client PC 102 to the MFP 101 is executed. Here, "172.24.10.10" is IP address information of the MFP 101, but configuration may also be taken to input a host name instead of the IP address information of the MFP 101.

When the connection to the MFP 101 succeeds, a user authentication screen is displayed on the Web browser of the client PC 102. When a correct username and password are inputted to this user authentication screen, user authentication succeeds and the TOP screen 300 of FIG. 3 is displayed.

If the dedicated app of the mobile terminal 103 is used, a function for automatically searching for the MFP 101 is executed. Consequently, a connection to the MFP 101 is executed without the performance of an operation for inputting the IP address or the host name of the MFP 101 as described above. When the connection to the MFP 101 succeeds, a user authentication screen of the dedicated app is displayed, and when user authentication succeeds, the TOP screen 300 of FIG. 3 is displayed.

A display area 302 of the TOP screen 300 displays the status of the MFP 101, and a display area 303 displays the status of a consumable of the MFP 101, in other words the status of print sheets in a sheet cassette that the printer 206 of the MFP 101 has. In addition, a display area 304 displays a remaining amount of toner for the printer 206 of the MFP 101. The display areas 303 and 304 display information in accordance with a printing method or a structure of the MFP 101.

A button 305 can accept a selection operation by a user, and when the button 305 is selected, the status or history of jobs performed by the MFP 101 is displayed. In addition, while the history or status of jobs is being displayed, it is possible to stop a job that is being performed.

A button 306 can accept a selection operation by a user, and when the button 306 is selected, a screen for registering or setting of various programs that operate on the MFP 101 is displayed. This screen includes an SMTP authentication setting item and a cloud personal setting item, and when the cloud personal setting item is selected, a cloud personal setting screen as illustrated in FIG. 4 is displayed. Description is given later for FIG. 4.

A button 307 can accept a selection operation by a user, and when the button 307 is selected, a screen that enables editing of data of an address book is displayed. This screen includes items for editing an address book, and, for example, when an item for setting a file destination in a new destination menu is selected, a file destination setting screen is displayed.

A button 308 can accept a selection operation by a user, and when the button 308 is selected, the save location of a reception/save file that is to be used is displayed. Here, a reception file is an image file that is received by the fax unit 209 via the telephone line 216 or a PDL image file received by the network I/F 211 via the network 107, for example. When the button 308 is pressed, a box in which such an image file is saved is displayed. In addition, a save file is an image file read by the scanner 205, for example, and a box in which such an image file is saved is displayed.

A button 309 can accept a selection operation by a user, and when the button 309 is selected, a setting screen for an administrator in which a license or the like is managed is displayed. A display area 301 is an area for displaying or accepting or input of a URL that is an access destination of the Web browser. In FIG. 3, the IP address of the MFP 101 is displayed.

FIG. 4 is a view which illustrates an example of a cloud personal setting screen. A cloud personal setting screen 400 is displayed on a Web browser of the client PC 102, or on a Web browser or a dedicated app of the mobile terminal 103. The cloud setting screen 400 is displayed upon the selection of the cloud personal setting item on the screen for performing registration and setting of various programs that is displayed in accordance with a selection operation of the button 306 of the TOP screen 300 of FIG. 3.

The cloud personal setting screen 400 is a screen for setting personal information necessary to use a cloud service. A display area 402 displays a username that is registered. In FIG. 4, the username tanaka is displayed.

A display area 403 can accept a setting of whether to use an SMTP service. In addition, a display area 404 can accept input of an email address for a user. A display area 405 can accept a setting of whether to use a cloud print. A display area 406 can accept input of a password for all cloud services.

Configuration may also be taken to preset an email address set in the mobile terminal 103 to the display area 404, when a user is using the mobile terminal 103. By such a configuration, it is possible to reduce setting operations by the user.

In addition, it is often the case that the mobile terminal 103 is constantly logged into the cloud service. Consequently, configuration may be taken such that, if the mobile terminal 103 is logged in to the cloud service before operation of the present embodiment, login information of the mobile terminal 103 is used without the display of the display area 406 being performed.

An OK button 407 is a button for confirming setting content in the cloud personal setting screen 400. When the OK button 407 is pressed, the inputted setting information is confirmed and registered in the MFP 101. When setting information is registered to the MFP 101 in accordance with the cloud personal setting screen 400 of FIG. 4, a Web site screen for the cloud service is displayed on the client PC 102 or the mobile terminal 103.

Registration of information of the screens of FIG. 3 and FIG. 4 to the MFP 101 may be realized in accordance with another method. For example, configuration may be taken such that, when a RUI dedicated app is installed on the mobile terminal 103, by activating the RUI dedicated app in accordance with an icon click operation or the like on a screen, the setting information of the cloud personal setting screen 400 of FIG. 4 is transmitted to the MFP 101. By such a configuration, it is possible to make registration to the MFP 101 explained by FIG. 3 and FIG. 4 easier, because there is no need to activate and set a Web browser at a time of a connection to the MFP 101.

Figure 5:
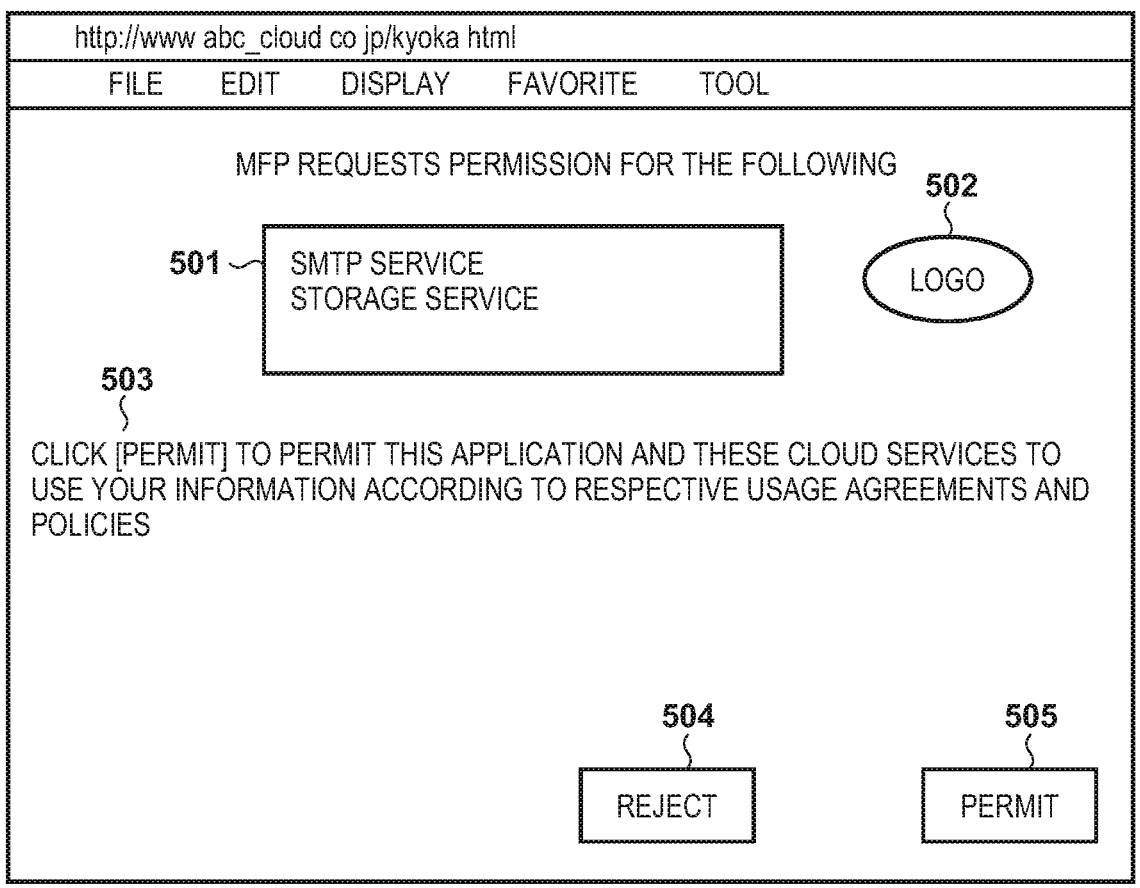
FIG. 5 is a view which illustrates a Web site screen of a cloud service.

FIG. 5 is view which illustrates an example of a Web site screen of a cloud service. A Web site screen 500 of the cloud service is a screen for querying a user as to whether to permit usage of the cloud service with respect to the MFP 101. The Web site screen 500 of the cloud service displays a logo for the cloud service in a display area 502 so that it is understood that this is a Web site of the cloud service.

A display area 501 displays a name of the cloud service in accordance with the setting content of the cloud personal setting screen 400 of FIG. 4. For example, if SMTP usage is set to "Yes" in the display area 403 of the cloud personal setting screen 400, "SMTP service" is displayed in the display area 501. For example, if cloud print usage is set to "Yes" in the display area 405 of the cloud personal setting screen 400, "storage service" is displayed in the display area 501.

A display area 503 is warning text for a user. It is possible to, in accordance with the warning text of the display area 503, allow a user to determine whether to permit or reject usage of the cloud service with respect to the MFP 101. A permit button 505 accepts a selection operation when the user has determined to permit usage of the cloud service with respect to the MFP 101. A reject button 504 accepts a selection operation when the user has determined to not permit (i.e. reject) usage of the cloud service with respect to the MFP 101.

Figure 6:
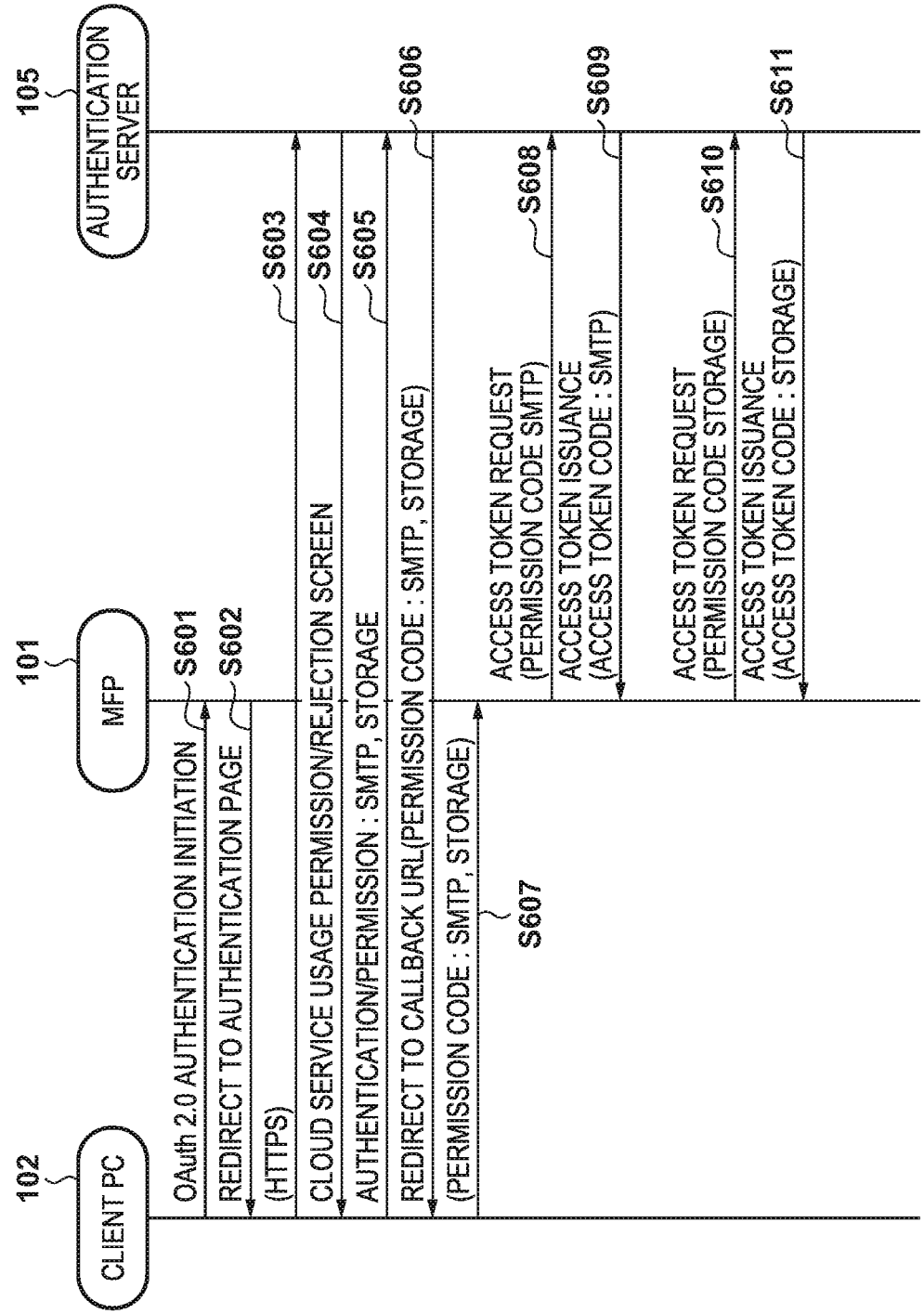
FIG. 6 is a sequence diagram which illustrates a procedure for processing for obtaining an access token.

FIG. 6 is a sequence diagram illustrating a procedure for processing for obtaining an access token that uses an RUI function of the MFP 101. In the present embodiment, the client PC 102 is explained as a remote terminal with respect to the MFP 101. However, operation is also similar in a case where, instead of the client PC 102, a dedicated app or the Web browser of the mobile terminal 103 is used as a remote terminal with respect to the MFP 101.

The processing of FIG. 6 is executed in a case where at least one of an item for cloud print usage of the display area 405 and an item for SMTP usage of the display area 403 of the cloud personal setting screen 400 of FIG. 4 is set to "YES".

Firstly, when the OK button 407 of the cloud personal setting screen 400 of FIG. 4 is pressed by a user, OAuth 2.0 authentication with respect to the MFP 101 is started from the client PC 102 (step S601).

The MFP 101, by the RUI function of the CPU 201, registers to the MFP 101 the content inputted by the cloud personal setting screen 400 in the client PC 102. The MFP 101 makes a URL redirect instruction so that the Web browser of the client PC 102 transitions to the cloud service Web site screen 500 of FIG. 5 (step S602).

In accordance with the redirect instruction from the MFP 101, the client PC 102 first uses an HTTPS protocol to access the authentication server 105 (step S603). The authentication server 105, after performing user authentication by the user authentication screen, transmits HTML data for the cloud service Web site screen 500 to the client PC 102 (step S604). The client PC 102 displays the cloud service Web site screen 500. The cloud service Web site screen 500 is a screen for accepting a designation of whether to permit or reject usage of the cloud service with respect to the MFP 101, as described by FIG. 5.

The client PC 102 accepts a press of the permit button 505 or the reject button 504 in the cloud service Web site screen 500. Here, assume that the permit button 505 for usage of an SMTP service and a storage service is pressed. The client PC 102 notifies the authentication server 105 that the user has permitted usage of an SMTP service and a storage service (step S605). The authentication server 105 sends to the client PC 102 permission codes for the storage service and the SMTP service, and also makes an instruction to the client PC 102 for a redirect to a callback URL (step S606). The client PC 102 transmits to the MFP 101 the permission code for the storage service and the permission code for the SMTP service that were obtained in step S606 (step S607).

The MFP 101 issues to the authentication server 105 an access token request command to which is attached the permission code for the SMTP service that was received from the client PC 102 (step S608). The authentication server 105, after receiving the access token request command issued from the MFP 101 in step S608 and confirming that the permission code attached to the command is correct, issues an access token for the SMTP service to the MFP 101 (step S609).

Similarly, the MFP 101 issues to the authentication server 105 an access token request command to which is attached the permission code for the storage service that was received from the client PC 102 (step S610). The authentication server 105, after receiving the access token request command issued from the MFP 101 in step S610 and confirming that the permission code attached to the command is correct, issues an access token for the storage service to the MFP 101 (step S611).

In the present embodiment, the MFP 101 obtains the access token from the authentication server 105 by the processing illustrated in FIG. 6. The MFP 101 then, as described later, associates the obtained access token with user information, and holds this in a memory unit such as the hard disk 210. By virtue of the present embodiment, by such a configuration, each time the MFP 101 uses the cloud service, it is possible to reduce an operation load on a user and it is possible to reduce communication traffic, in comparison to a case where communication with a terminal must be performed.

Figure 7:
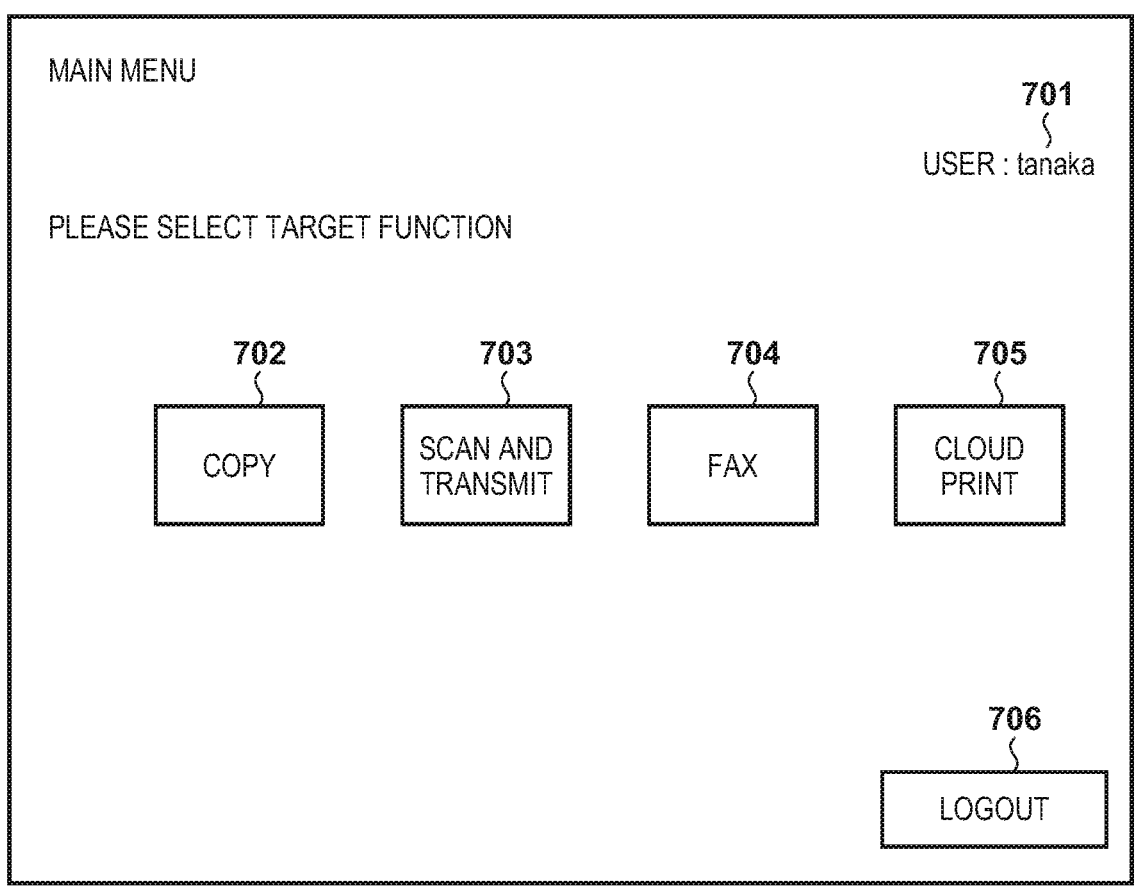
FIG. 7 is a view illustrating a main menu screen which is displayed on the MFP.

FIG. 7 is a view illustrating an example of a main menu screen which is displayed on the MFP 101. When a user that uses the MFP 101 brings the ID card 215 close to the card reader 214, user authentication is performed based on ID information obtained from the ID card 215. When the user authentication succeeds, login of the user is performed, and a main menu screen 700 of FIG. 7 is displayed.

The username of the logged-in user is displayed in a display area 701 of the main menu screen 700. FIG. 7 displays that a user "tanaka" is logged in. In addition, the main menu screen 700 displays buttons 702, 703, 704, and 705 that correspond to functions that the MFP 101 can execute.

A copy function setting screen is displayed when the copy button 702 is pressed by the user, and a "scan and transmit" function setting screen is displayed when the button 703 is pressed by the user. A fax function setting screen is displayed when the button 704 is pressed by the user, and a cloud print function setting screen is displayed when the button 705 is pressed by the user. When a logout button 706 is pressed by the user, a logout is executed, and the login screen is transitioned to.

In the present embodiment, if cloud print usage is set to "YES" in the display area 405 of the cloud personal setting screen 400 of FIG. 4 and an access token corresponding to the logged-in user has been obtained and is saved, the button 705 is displayed.

If a validity period for the cloud service access token corresponding to the logged-in user has expired, the button 705 which indicates a cloud print function is grayed out and a selection operation by a user is restricted. By such a configuration, because the cloud print setting screen is not displayed even if the button 705 is pressed, it is possible to make the user recognize that the validity period has expired. When the button 705 is pressed, a cloud print setting screen 800 illustrated in FIG. 8 is displayed.

FIG. 8 is a view illustrating an example of a cloud print setting screen that is displayed on the MFP 101. The username of the logged-in user is displayed in a display area 801 of the cloud print setting screen 800. If a validity period has been designated for the obtained access token, the validity period is displayed in a display area 802.

Documents 803, 804, and 805 are information for document data registered in the storage service, and FIG. 8 displays a document name, a number of pages, and a registration date for each. Selection/non-selection is switched each time the documents 803, 804, and 805 are respectively pressed. For example, the text and the background color are reversed and displayed when one is selected.

A printing setting button 806 is a button for displaying a print setting screen. In the print setting screen it is possible to receive various print settings such as a paper size to be printed to, a double side/single side print setting, and a page layout such as 1in1/2in1/4in1.

A print button 807 is displayed as enabled if the documents 803, 804, and 805 are displayed. When the print button 807 is pressed, the MFP 101 uses the storage service access token corresponding to the logged-in user to obtain document data stored on the storage server 106. The MFP 101 then performs print processing for the obtained document data, by the setting values set on the print setting screen described above. When a logout button 808 is pressed by the user, a logout is executed, and the login screen is transitioned to.

Figure 9:
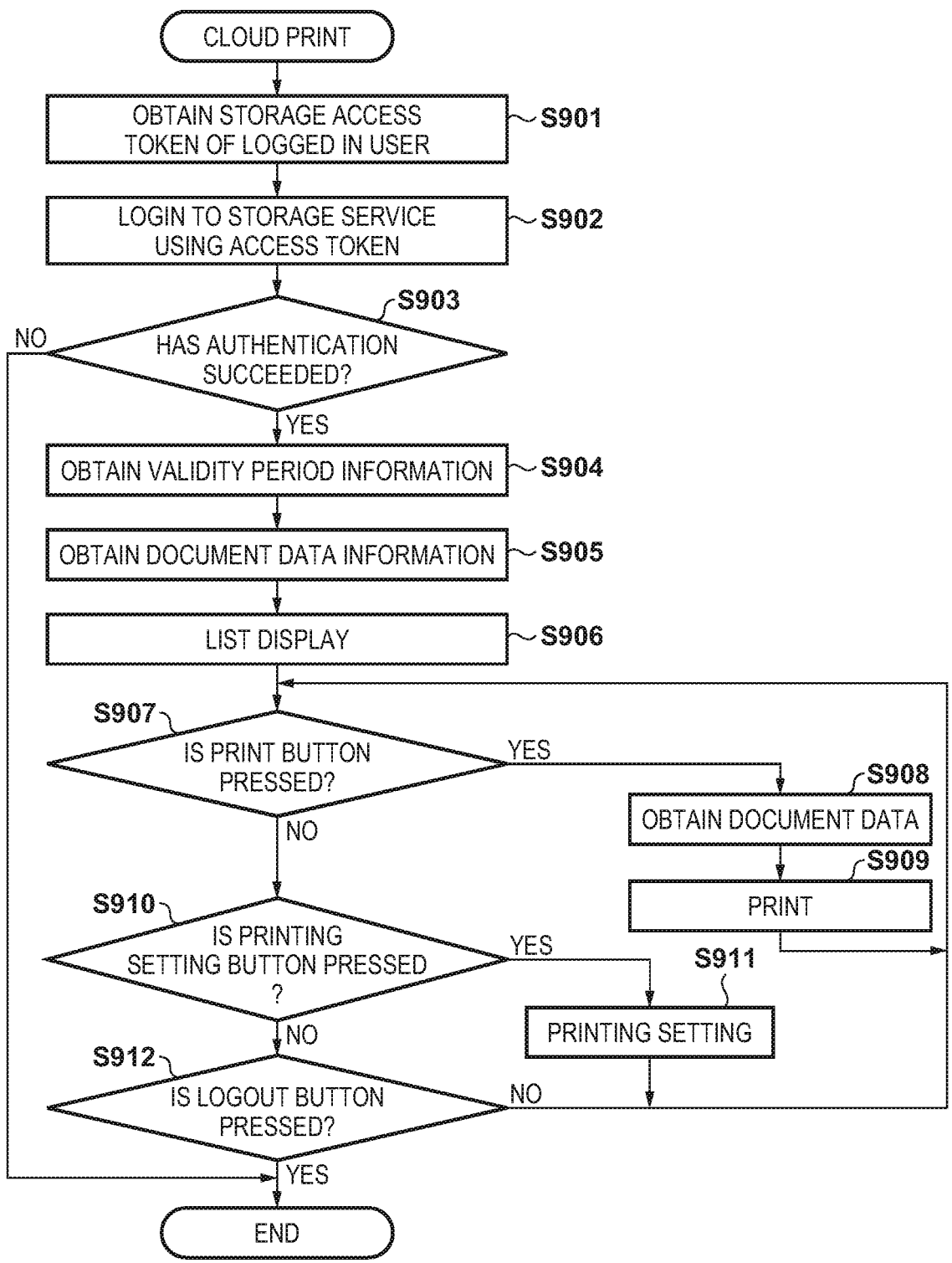
FIG. 9 is a flowchart which illustrates cloud print processing.

FIG. 9 is a flowchart which illustrates cloud print processing in the present embodiment. Processing of FIG. 9 is realized by the CPU 201 reading a program stored in the ROM 202 into the RAM 203, and executing the program, for example. The processing of FIG. 9 is started when the button 705, which indicates a cloud print function, of the main menu screen 700 of FIG. 7 is pressed.

In step S901, the CPU 201 obtains a storage service access token corresponding to the logged in user which was received from the authentication server 105 in step S611 of FIG. 6. In step S902, the CPU 201 uses the obtained storage service access token to login to the storage service of the storage server 106.

In step S903, the CPU 201 determines whether authentication for the time of login to the storage service succeeded or failed. The determination of step S903 is performed based on an authentication result notified from the storage server 106, for example. When it is determined that authentication failed, the processing of FIG. 9 ends. When it is determined that authentication succeeded, in step S904, the CPU 201 obtains validity period information of the storage service access token. In step S905, the CPU 201 obtains information of document data stored in the storage server 106. In step S906, the CPU 201 displays the cloud print setting screen 800 of FIG. 8, based on the information obtained in step S904 and in step S905.

In step S907, the CPU 201 determines whether a press of the print button 807 in the cloud print setting screen 800 is accepted. When it is determined that a press of the print button 807 is accepted, in step S908, the CPU 201 obtains document data corresponding to the selected document from the storage server 106. In step S909, the CPU 201 performs print processing for the obtained document data, based on setting content of the print setting screen. Subsequently, processing repeats from step S907.

When it is determined that a press of the print button 807 is not accepted, the CPU 201 determines whether a press of the printing setting button 806 is accepted. When it is determined that a press of the printing setting button 504 is accepted, in step S911, the CPU 201 causes the print setting screen to be displayed. When the setting content in the print setting screen is confirmed, the processing from step S907 repeats.

When it is determined that a press of the printing setting button 806 is not accepted, the CPU 201 determines whether a press of the logout button 808 is accepted. When it is determined that a press of the logout button 808 is accepted, the processing of FIG. 9 ends. When it is determined that a press of the logout button 808 is not accepted, the processing repeats from step S907.

FIGS. 10A and 10B are views which illustrate examples of management forms of access tokens which are stored in the MFP 101. FIG. 10A illustrates management data for user information. The CPU 201 registers user information, as in FIG. 10A, based on information obtained from the screens of FIG. 3 and FIG. 4.

For each piece of user information, a unique user ID 1001 is added as identification information. In addition, the username displayed in the display area 402 of the cloud personal setting screen 400 of FIG. 4 is registered in a region 1002. In addition, the password displayed in the display area 406 is registered in a region 1003. In addition, the email address displayed in the display area 404 is registered in a region 1004.

The storage service access token obtained in step S611 and the SMTP service access token obtained in step S609 of FIG. 6 are held and managed as illustrated in FIG. 10B. Actual data of each access token is stored in a region 1012, and validity period information for the access token is registered in a region 1013.

As illustrated in FIG. 10B, for each access token a unique access token ID is added as identification information. The ID number for the SMTP service access token is registered in a region 1005 of FIG. 10A, and the ID number for the storage service access token is registered in a region 1006 of FIG. 10A.

The user information management data of FIG. 10A and the access token management data of FIG. 10B are stored in the hard disk 210, but at that time the data is subject to encryption processing by the CPU 201. As long as a relationship between items is maintained as illustrated in FIGS. 10A and 10B for the user information management data and the access token management data, there is no limitation on a table format, and they may be managed in accordance with another format.

As described above, in the present embodiment, an MFP is remotely accessed from a terminal, and user information and information for usage of a cloud service (for example, a cloud print) is set. The MFP is controlled so as to cause the terminal to access an authentication server, and a permission code for the cloud service is obtained via the terminal. The MFP then uses the obtained permission code to obtain an access token from the authentication server, and holds the access token internally. Subsequently, if a user logs in to the MFP and designates the cloud service, the MFP receives provision of the service from the cloud without performing communication with the terminal to obtain the access token. As a result, it is possible to reduce communication traffic with the terminal, and to reduce an operation load for the user.

Second Embodiment

There are cases where the validity period of an access token is very short and cases where operation for obtaining input of a password by a user each time is set due to a security perspective. In such cases, there is a need to reobtain the access token by using the RUI function of the MFP 100 each time a cloud print is executed. In the present embodiment, a Web browser function installed in the MFP 100 is used in view of such cases. Hereinafter, description will be given for points that differ from the first embodiment.

FIG. 11 is a sequence diagram which illustrates a procedure for processing for obtaining an access token in the present embodiment. User authentication is performed when the ID card 215 of a user is brought close to the card reader 214 of the MFP 101, and when successfully authenticated, the main menu screen 700 of FIG. 7 is displayed.

When the cloud print button 705 of the main menu screen 700 is pressed, the MFP 101 displays a screen (not shown) for the input of a cloud password, and accepts input of the password (step S1101). Here, the cloud password corresponds to the password inputted to the display area 406 of the cloud personal setting screen 400 of FIG. 4.

The MFP 101 accesses the authentication server 105 using an HTTPS protocol (step S1102). The authentication server 105, after performing user authentication by the user authentication screen, transmits HTML data for the cloud service Web site screen 500 to the MFP 101 (step S1103). The MFP 101 displays the cloud service Web site screen 500 by the Web browser function.

The MFP 101 accepts a press of the permit button 505 or the reject button 504 in the cloud service Web site screen 500. Here, assume that the permit button 505 for usage of a storage service is pressed. The MFP 101 notifies the authentication server 105 that the user has permitted usage of a storage service (step S1104). The authentication server 105 sends a permission code for the storage service to the MFP 101 (step S1105).

The MFP 101 issues to the authentication server 105 an access token request command to which is attached the permission code for the storage service that was received from the authentication server 105 (step S1106). The authentication server 105 receives the access token request command issued from the MFP 101 in step S1106. The authentication server 105, after confirming that the permission code attached to the command is correct, issues a storage service access token to the MFP 101 (step S1107).

The MFP 101 transmits the storage service access token obtained in step S1107 to the storage server 106 (step S1108). The storage server 106 performs user authentication, and when the authentication succeeds, notifies the MFP 101 that the authentication succeeded (step S1109).

Next, the MFP 101 requests information for a list of document data stored in the storage server 106 (step S1110). The storage server 106 transmits list information for document data corresponding to the logged in user to the MFP 101 (step S1111). The MFP 101 displays the cloud print setting screen 800 of FIG. 8, based on the document data list information obtained in step S1111.

In the cloud print setting screen 800, a document to be printed is selected and the print button 807 is pressed by a user (step S1112). Consequently, the MFP 101 requests the storage server 106 to obtain the document data selected by the user (step S1113). The storage server 106 transmits the requested document data to the MFP 101 (step S1114). The MFP 101 generates print data by the formatter unit 208 based on the obtained document data and in accordance with setting content of the print setting screen, and performs printing by the printer 206 (step S1115). As illustrated by FIG. 11, an obtainment destination for the cloud service Web site screen 500 differs from an obtainment destination for the document data.

Figure 12:
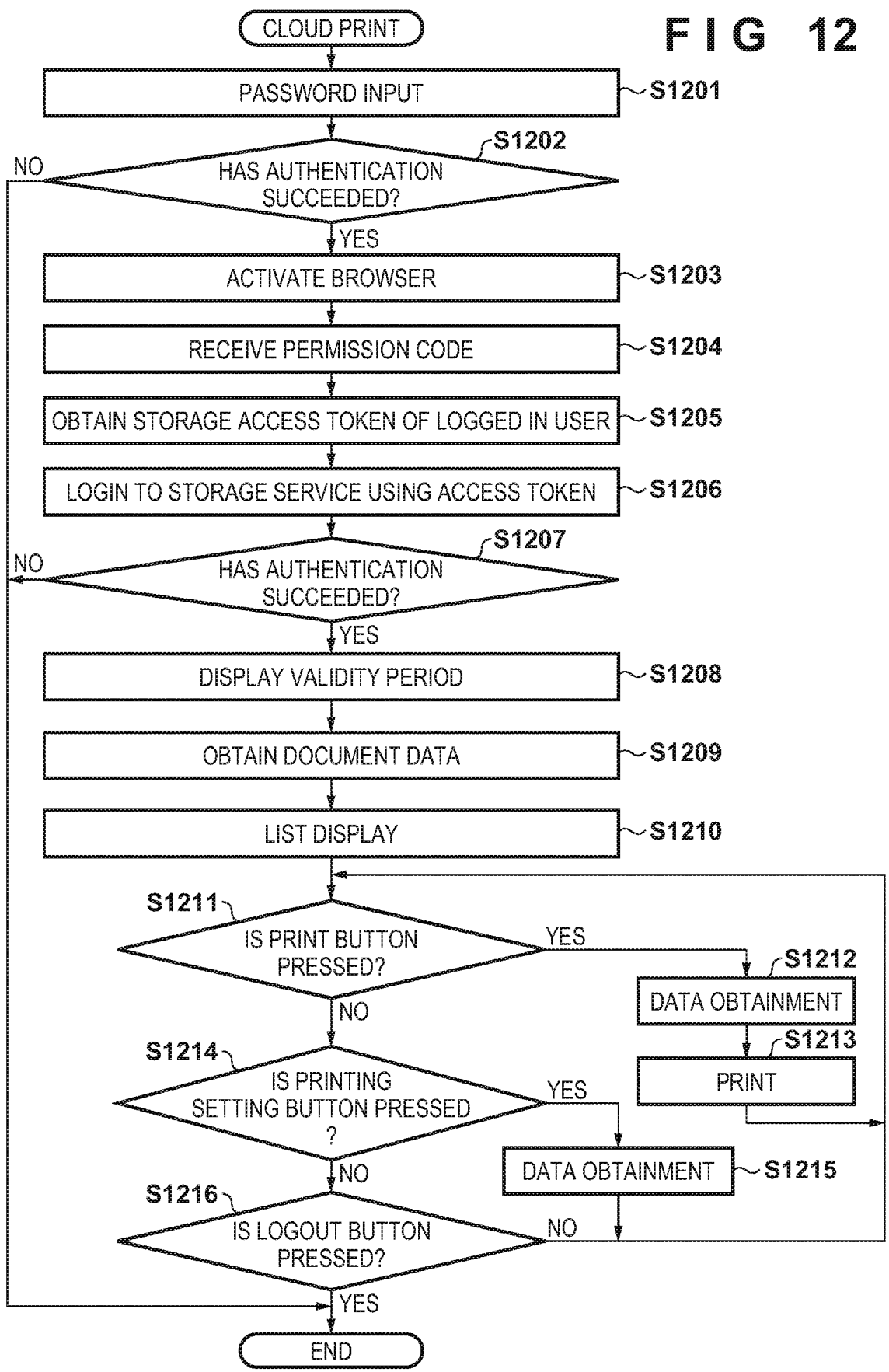
FIG. 12 is a flowchart which illustrates cloud print processing.

FIG. 12 is a flowchart which illustrates cloud print processing in the present embodiment. Processing of FIG. 12 is realized by the CPU 201 reading a program stored in the ROM 202 into the RAM 203, and executing the program, for example. The processing of FIG. 12 is started when the button 705, which indicates a cloud print function, of the main menu screen 700 of FIG. 7 is pressed.

In step S1201, the CPU 201 displays a screen for the input of a cloud password. This processing corresponds to the processing of step S1101 of FIG. 11. When a password is inputted, the CPU 201 requests the authentication server 105 for authentication.

In step S1202, the CPU 201 determines whether authentication by the authentication server 105 succeeded or failed. The determination of step S1202 is performed based on an authentication result notified from the authentication server 105, for example. When it is determined that authentication failed, the processing of FIG. 12 ends. When it is determined that authentication succeeded, in step S1203, the CPU 201 activates a Web browser and displays the cloud service Web site screen 500 of FIG. 5 based on HTML data received from the authentication server 105. When the permit button 505 of the cloud service Web site screen 500 is pressed, the CPU 201 notifies the authentication server 105 that usage the storage service is permitted.

In step S1204, the CPU 201 receives a permission code for the storage service from the authentication server 105. The CPU 201 then uses the permission code received in step S1204 to request the authentication server 105 for a storage service access token. The authentication server 105 issues a storage service access token in response to the request from the MFP 101.

In step S1205, the CPU 201 receives the storage service access token for the user who performed the login in step S1201. The CPU 201 stores the obtained storage service access token, in association with the user information, in the hard disk 210 of the MFP 101 as illustrated in FIGS. 10A and 10B.

In step S1206, the CPU 201 uses the storage service access token, which was issued by the authentication server 105, to login to the storage server 106. In step S1207, the CPU 201 determines whether authentication for the time of login to the storage server 106 succeeded or failed. The determination of step S1206 may be performed based on an authentication result notified from the storage server 106 in step S1109 of FIG. 11, for example. When it is determined that authentication failed, the processing of FIG. 12 ends. When it is determined that authentication succeeded, in step S1208, the CPU 201 obtains validity period information of the storage service access token. In step S1209, the CPU 201 obtains information of document data stored in the storage server 106. In in step S1210, the CPU 201 displays the cloud print setting screen 800 of FIG. 8, based on the information obtained in step S1208 and in step S1209.

In step S1211, the CPU 201 determines whether a press of the print button 807 in the cloud print setting screen 800 is accepted. When it is determined that a press of the print button 807 is accepted, in step S1212, the CPU 201 obtains document data corresponding to the selected document from the storage server 106. In step S1213, the CPU 201 performs print processing for the obtained document data, based on setting content of the print setting screen. Subsequently, processing repeats from step S1211.

When it is determined that a press of the print button 807 is not accepted, the CPU 201 determines whether a press of the printing setting button 806 is accepted. When it is determined that a press of the printing setting button 806 is accepted, in step S1215, the CPU 201 causes the print setting screen to be displayed. When the setting content in the print setting screen is confirmed, the processing from step S1211 repeats.

When it is determined that a press of the printing setting button 806 is not accepted, the CPU 201 determines whether a press of the logout button 808 is accepted. When it is determined that a press of the logout button 808 is accepted, the processing of FIG. 12 ends. When it is determined that a press of the logout button 808 is not accepted, the processing repeats from step S1211.

As described above, by virtue of the present embodiment, even in a case where the MFP 101 needs to reobtain an access token each time it executes a cloud print, the MFP 101 can receive provision of a service from the cloud without performing communication with a terminal.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-039774, filed Mar. 2, 2017, which is hereby incorporated by reference herein in its entirety.

What is claimed is:

1. An image forming apparatus, comprising:
   at least one memory that stores a set of instructions; and
   at least one processor that executes the set of instructions to function as:
   a first obtainment unit configured to obtain user information of a login user who logged-in to the image forming apparatus;
   a second obtainment unit configured to obtain an access token for receiving provision of a service from a service provider;
   a storage unit configured to store, in a memory unit, the access token obtained by the second obtainment unit in association with the user information obtained by the first obtainment unit;
   an execution unit configured to, in accordance with an instruction, access the service provider using the access token stored in the memory unit by the storage unit, and execute a function corresponding to the instruction; and
   a display control unit configured to display a button corresponding to the function on a menu screen to be provided to the login user, on condition that the access token is associated with the user information of the login user,
   wherein, in a case where a validity period of the access token expires, the display control unit displays the button in a form different from a normal display form.

2. The image forming apparatus according to claim 1, wherein the second obtainment unit obtains the access token from the service provider in a case where receiving a provision of service from the service provider is permitted.

3. The image forming apparatus according to claim 2, wherein the at least one processor further executes the set of instructions to function as an acceptance unit configured to accept the permission,
   wherein the second obtainment unit obtains the access token from the service provider in a case where the permission is accepted in accordance with the acceptance unit.

4. The image forming apparatus according to claim 3, wherein the acceptance unit is a user interface screen displayed by a Web browser, based on data provided from the service provider.

5. The image forming apparatus according to claim 2, wherein the at least one processor further executes the set of instructions to function as a third obtainment unit configured to obtain a permission code for permitting usage of the access token in a case where receiving the provision of service from the service provider is permitted, wherein the second obtainment unit uses the permission code obtained by the third obtainment unit to obtain the access token from the service provider.

6. The image forming apparatus according to claim 1, wherein the first obtainment unit obtains the user information, of the login user who logged-in to the image forming apparatus, that is inputted in an external terminal in accordance with a remote user interface function.

7. The image forming apparatus according to claim 6, wherein the terminal is a mobile terminal.

8. The image forming apparatus according to claim 1, wherein the user information of the login user who logged-in to the image forming apparatus includes information used in authentication when receiving the provision of service from the service provider.

9. The image forming apparatus according to claim 1, wherein an obtainment destination of the access token by the second obtainment unit differs to an access destination in accordance with the execution unit.

10. The image forming apparatus according to claim 1, wherein a function to be executed by the execution unit is a cloud print.

11. A method executed on an image forming apparatus, the method comprising:

obtaining user information of a login user who logged-in to the image forming apparatus;

obtaining an access token for receiving provision of a service from a service provider;

storing the obtained access token in a memory unit in association with the obtained user information;

in accordance with an instruction, accessing the service provider using the access token stored in the memory unit, and executing a function corresponding to the instruction; and displaying a button corresponding to the function on a menu screen to be provided to the login user, on condition that the access token is associated with the user information of the login user, wherein, in a case where a validity period of the access token expires, the displaying displays the button in a form different from a normal display form.

12. A non-transitory computer-readable storage medium storing a program for causing an image forming apparatus to execute:

obtaining user information of a login user who logged-in to the image forming apparatus;

obtaining an access token for receiving provision of a service from a service provider;

storing the obtained access token in a memory unit in association with the obtained user information;

in accordance with an instruction, accessing the service provider using the access token stored in the memory unit, and executing a function corresponding to the instruction; and displaying a button corresponding to the function on a menu screen to be provided to the login user, on condition that the access token is associated with the user information of the login user, wherein, in a case where a validity period of the access token expires, the displaying displays the button in a form different from a normal display form.

13. A system including a terminal and an image forming apparatus, wherein the terminal comprises:

at least one memory that stores a set of instructions; and at least one processor that executes the set of instructions to function as:

a permission unit configured to permit the image forming apparatus to receive a provision of service from a service provider; and a transmission unit configured to obtain a permission code for permitting usage of an access token for receiving the provision of service from the service provider, and transmit the obtained permission code to the image forming apparatus, and the image forming apparatus comprises:

at least one memory that stores a set of instructions; and at least one processor that executes the set of instructions to function as:

a first obtainment unit configured to obtain user information of a login user who logged-in to the image forming apparatus;

a second obtainment unit configured to use the permission code transmitted by the transmission unit to obtain the access token from the service provider;

a storage unit configured to store, in a memory unit, the access token obtained by the second obtainment unit in association with the user information obtained by the first obtainment unit;

an execution unit configured to, in accordance with an instruction, access the service provider using the access token stored in the memory unit by the storage unit, and execute a function corresponding to the instruction; and a display control unit configured to display a button corresponding to the function on a menu screen to be provided to the login user, on condition that the access token is associated with the user information of the login user, wherein, in a case where a validity period of the access token expires, the display control unit displays the button in a form different from a normal display form.

14. The system according to claim 13, wherein the first obtainment unit obtains the user information that is inputted in the terminal in accordance with a remote user interface function.

* * * * *